(12) United States Patent
Champigny

(10) Patent No.: US 10,963,300 B2
(45) Date of Patent: Mar. 30, 2021

(54) ACCELERATING DATAFLOW SIGNAL PROCESSING APPLICATIONS ACROSS HETEROGENEOUS CPU/GPU SYSTEMS

(71) Applicant: Raytheon Company, Waltham, MA (US)

(72) Inventor: Michael Champigny, Portsmouth, RI (US)

(73) Assignee: Raytheon Company, Waltham, MA (US)

(*) Notice: Subject to any disclaimer, the term of this patent is extended or adjusted under 35 U.S.C. 154(b) by 99 days.

(21) Appl. No.: 16/372,618

(22) Filed: Apr. 2, 2019

(65) Prior Publication Data
US 2020/0183738 A1    Jun. 11, 2020

Related U.S. Application Data

(60) Provisional application No. 62/776,119, filed on Dec. 6, 2018.

(51) Int. Cl.
*G06F 9/48* (2006.01)
*G06F 9/50* (2006.01)

(52) U.S. Cl.
CPC .......... *G06F 9/4881* (2013.01); *G06F 9/485* (2013.01); *G06F 9/5016* (2013.01)

(58) Field of Classification Search
CPC ....... G06F 9/4881; G06F 9/485; G06F 9/5016
See application file for complete search history.

(56) References Cited

U.S. PATENT DOCUMENTS

| 2012/0001905 A1* | 1/2012 | Andonieh | G06T 1/20 345/419 |
| 2017/0109213 A1 | 4/2017 | Barik et al. | |
| 2018/0011792 A1* | 1/2018 | Koker | G06F 12/0804 |

(Continued)

FOREIGN PATENT DOCUMENTS

| CN | 108694151 A | 10/2018 |
| TW | 2017-29122 A | 8/2017 |

(Continued)

OTHER PUBLICATIONS

Sungpack Hong; Accelerating CUDA Graph Algorithms at Maximum Warp; ACM; Feb. 2011 (Year: 2011).*

(Continued)

*Primary Examiner* — Dong U Kim
(74) *Attorney, Agent, or Firm* — Daly Crowley Mofford & Durkee, LLP

(57) ABSTRACT

A method includes: forming a virtual tile cluster having tiles, wherein a tile comprises a processor and memory from a CPU device and a GPU device, and a tile in the GPU device further comprises subprocessors; forming a virtual unified memory that is accessible by the CPU and GPU devices; receiving a task; assigning the task to a tile of the virtual tile cluster according to a pre-defined rule. When the task is assigned to a tile in the GPU device, the method further performs: broadcasting the task to the subprocessors of a tile using a GPU shuffle instruction; and dividing data for the task and assigning the divided data to the subprocessors, wherein each subprocessor runs a codelet using the each of divided data. The task is executed by the at least one tile of the virtual tile cluster.

19 Claims, 10 Drawing Sheets

(56) References Cited

U.S. PATENT DOCUMENTS

| | | | |
|---|---|---|---|
| 2018/0018299 A1* | 1/2018 | Han | G06F 9/3887 |
| 2018/0040096 A1* | 2/2018 | Benthin | G06T 1/20 |
| 2018/0107524 A1* | 4/2018 | Fong | G06F 9/5061 |
| 2018/0373540 A1* | 12/2018 | Bao | G06F 9/5038 |
| 2020/0272513 A1* | 8/2020 | Ananthakrishnan | G06F 9/30123 |

FOREIGN PATENT DOCUMENTS

| | | |
|---|---|---|
| WO | WO 2012/058360 A2 | 5/2012 |
| WO | WO 2012/082557 A2 | 6/2012 |

OTHER PUBLICATIONS

Hung-Fu Li; An OpenMP Programming Toolkit for Hybrid CPU/GPU Clusters Based on Software Unified Memory; Journal of Information Scient and Engineering; 2016 (Year: 2016).*

Xinxin Mei; Energy Efficient Real-time Task Scheduling on CPU-GPU Hybrid Clusters; IEEE; 2017 (Year: 2017).*

Sangman Kim; Networking Abstractions for GPU Programs; 2015 (Year: 2015).*

Pramod Bhatotia; Shredder: GPU-Accelerated Incremental Storage and Computation; 2012 (Year: 2012).*

Taiwan Office Action (with English Translation) dated Aug. 13, 2020 for Taiwan Application No. 108139888; 21 Pages.

Augonnet et al., "StarPU: a Runtime System for Scheduling Tasks Over Accelerator-Based Multicore Machines;" Research Report RR-7240; Submitted on Mar. 28, 2010; 34 Pages.

Janzén et al., "Partitioning GPUs for Improved Scalability;" 2016 IEEE 28th International Symposium on Computer Architecture and High Performance Computing; Oct. 26, 2016; 8 Pages.

Kornaros et al., "Enabling Efficient Job Dispatching in Accelerator-extended Heterogeneous Systems with Unified Address Space;" 2018 30th International Symposium on Computer Architecture and High Performance Computing; Sep. 24, 2018; 9 Pages.

Nvidia Cuda™, "NVIDIA CUDA C Programming Guide;" Version 4.2; Apr. 16, 2012; Part 1 of 2; 87 Pages.

Nvidia Cuda™, "NVIDIA CUDA C Programming Guide;" Version 4.2; Apr. 16, 2012; Part 2 of 2; 86 Pages.

Wikipedia, "Circular Buffer;" Retrieved from https://en.wikipedia.org/w/index.php?title=Circular_buffer&oldid=724733214; Jun. 11, 2016; 4 Pages.

PCT International Search Report and Written Opinion dated Jan. 22, 2020 for International Application No. PCT/US2019/057796; 22 Pages.

Krieder et al., "Design and Evaluation of the GeMTC Framework for GPU-enabled Many-Task Computing;" Proceedings of the 23rd ACM International Symposium on High-Performance Parallel and Distributed Computing (HPDC); Jun. 2014; pp. 153-164; 12 Pages.

Steinberg et al., "Whippletree: Task-based Scheduling of Dynamic Workloads on the GPU;" ACM Transactions on Graphics; vol. 33, No. 6, Article 228; Nov. 2014; 11 Pages.

Yeh et al., "Pagoda: Fine-Grained GPU Resource Virtualization for Narrow Tasks;" Proceedings of the 22nd ACM SIGPLAN Symposium on Principles and Practice of Parallel Programming (PPoPP); Feb. 2017; pp. 221-234; 13 Pages.

Zhang et al., "CPU-assisted GPU Thread Pool Model for Dynamic Task Parallelism;" IEEE International Conference on Networking, Architecture and Storage (NAS); Aug. 2015; pp. 135-140; 6 Pages.

Response (with English Translation) to Taiwan Office Action dated Aug. 13, 2020 for Taiwan Application No. 108139888; Response filed Nov. 16, 2020; 57 Pages.

* cited by examiner

ACCELERATING DATAFLOW SIGNAL PROCESSING APPLICATIONS ACROSS HETEROGENEOUS CPU/GPU SYSTEMS

CROSS REFERENCE TO RELATED APPLICATION

This application claims the benefit of U.S. Provisional Application No. 62/776,119 filed Dec. 6, 2018 under 35 U.S.C. § 119(e) which application is hereby incorporated herein by reference in its entirety.

BACKGROUND

GPU devices are optimized for computational throughput as opposed to response time (i.e., latency). Conventional design choices in the architecture and associated software of GPUs are oriented towards high sustained throughput of arithmetic operations. In particular, GPUs have relatively small and simple caches and software-managed scratchpad memories which maximize chip real-estate for large numbers of arithmetic logic units (ALUs) for the parallel processing of massive data sets. However, the current bulk-synchronous programming model of GPUs limits their applicability to host a flexible application that requires a certain level of task scheduling. Known GPU scheduling policies are defined in hardware and do not allow manual algorithm placement on GPU multi-processors. For example, running an application that requires multi-processor synchronization, such as producer-consumer pattern, on the same multi-processors may lead to a deadlock. In conventional systems it is also difficult to provide an environment for processing tasks where similar tasks could be co-scheduled on the same multi-processor to get benefit from the locality, such as utilizing the local GPU cache better.

The Compute Unified Device Architecture (CUDA) framework from NVIDIA CORP provides an ability to launch cooperative thread grids on a GPU which can be synchronized through a global barrier on the GPU itself (without having to synchronize with a barrier on the CPU). This feature allows the user to schedule a pipeline of kernels (i.e., GPU programs) to the GPU. However, the off-the-shelf GPU scheduler still schedules thread blocks in an undefined way across the entire GPU device which prevents manual placement of thread blocks on GPU multi-processors. This limitation may underutilize the GPU resources.

SUMMARY

In accordance with the concepts, techniques and systems described herein is an efficient method for accelerating dataflow signal processing over a heterogeneous CPU/GPU system. The techniques and systems described herein may provide a software middleware that presents a GPU device as a virtual compute cluster.

According to one illustrative embodiment, a method may include: forming a virtual tile cluster, wherein the virtual tile cluster comprises a plurality of tiles, wherein each of the tiles comprises a main processor and memory from a Central Processing Unit (CPU) device or a Graphics Processing Unit (GPU) device, and wherein a tile in the GPU device further comprises one or more subprocessors; forming a virtual unified memory, wherein the virtual unified memory is accessible by the CPU device and GPU device and the virtual unified memory comprises one or more ingress rings and one or more egress rings; generating a task; assigning the task to at least one tile of the virtual tile cluster according to a pre-defined rule; and inserting the task into a slot in an ingress ring in the virtual unified memory. Herein, when the task is assigned to the at least one tile in the GPU device, the method may perform: broadcasting the task to the one or more subprocessors of the at least one tile using a GPU shuffle instruction; and dividing data associated with the task and assigning each of divided data to each of the one or more subprocessors, wherein the each of the one or more subprocessors runs a codelet corresponding to the task using the each of divided data. Furthermore, the task may be executed by the at least one tile of the virtual tile cluster.

In one aspect, the method may further include: generating a thread corresponding to the task, wherein the thread is suspended when the task is assigned to the at least one tile; inserting a completion token for the task into an egress ring in the virtual unified memory upon completion of execution of the task; and in response to pulling the completion token from the egress ring, waking up the thread. Herein, the completion token may comprise a reference to a barrier to the CPU device that is associated with the thread and the barrier is unblocked upon the pulling the completion token.

In one aspect, the main processor of the at least one tile in the GPU device may comprise a vector processor and the one or more subprocessors comprises one or more scalar processors.

In one aspect, numbers of the one or more ingress ring and one or more egress ring may be configurable.

In one aspect, the at least one tile of the virtual tile cluster may sustain a same resource.

In one aspect, the task may be dispatched based upon an opcode of the task.

In one aspect, the task may be broadcasted by a hardware instruction of the GPU device.

In one aspect, the codelet corresponding to the task may be selected from a codelets package.

In one aspect, a lane of each of the tiles may be delegated to interact with the ingress ring and the lane dispatches the task from the ingress ring.

In one aspect, a subrange of the divided data assigned to a subprocessor may be different from another subrange of the divided data assigned to another subprocessor.

In one aspect, an ingress ring and an egress ring may be dedicated to each tile of the virtual tile cluster.

In one aspect, the pre-defined rule may comprise mapping a tile of the virtual tile cluster to one or more codelets.

According to another illustrative embodiment, a system may include: a Central Processing Unit (CPU) runtime; a Graphics Processing Unit (GPU) runtime; a virtual tile cluster comprising a plurality of tiles, wherein each of the tiles comprises a main processor and memory from the CPU runtime and GPU runtime, and wherein a tile in the GPU runtime further comprises one or more subprocessors; and a virtual unified memory comprising one or more ingress rings and one or more egress ring, wherein the virtual unified memory is accessible by the CPU runtime and GPU runtime. Herein, the CPU runtime may be configured to: generate a task; assign the task to at least one tile of the virtual tile cluster according to a pre-defined rule; and execute the task by the at least one tile of the virtual tile cluster. In addition, the GPU runtime may be configured to: in response to the task being assigned to the at least one tile in the GPU runtime, insert the task into an ingress ring in virtual unified memory; broadcast the task to the one or more subprocessors of the at least one tile using a GPU shuffle instruction; and divide data associated with the task and assigning each of divided data to each of the one or more subprocessors, wherein the each of the one or more subprocessors runs a codelet corresponding to the task using the each of divided data.

In one aspect, the CPU runtime may be further configured to: generate a thread corresponding to the task, wherein the thread is suspended when the task is assigned to the at least one tile; and in response to pulling a completion token from an egress ring in the virtual unified memory, wake up the thread, wherein the GPU runtime inserts a completion token for the task into a slot into the egress ring in the virtual unified memory upon completion of execution of the task. Herein, the completion token may comprise a reference to a barrier to the CPU runtime that is associated with the thread and the barrier is unblocked upon the pulling the completion token.

In one aspect, the main processor of the at least one tile in the GPU runtime may comprise a vector processor and the one or more subprocessors, wherein each subprocessor comprises a scalar processor.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

For convenience, certain introductory concepts and terms used in the specification are collected here.

As used herein, the term "scalar processor" is used to describe a processor that performs computations on one number or set of data at a time, where the data is an integer or a floating number. That is, the scalar processor executes instructions sequentially one at a time without parallelism. Each instruction operates one on atomic data item at a time. A scalar processor is known as a "single instruction stream single data stream" (SISD) processor. In a GPU device, a scalar processor is equivalent to a lane belonging to a vector processor.

As used herein, the term "vector processor" is used to describe a processor that performs computations on one or multi-dimensional arrays of data called vectors simultaneously. A vector processor is known as a "single instruction stream multiple data stream" (SIMD) processor. Vector processors can improve performance on certain type of works, for example numerical simulation or similar tasks. Modern graphic processing units (GPUs) operate multi-threaded, which can be considered as vector processors.

As used herein, the term "scratchpad memory" is used to describe an internal memory that is used for temporary storage of calculations, data, and other work in progress. Conventionally, the scratchpad memory comprises high-speed memory to hold small items of data for rapid retrieval. Modern GPU devices are provided a certain amount of scratchpad memory (e.g., 16 KB) per multi-processor of a GPU processor. A GPU may have any number of multi-processors and each of the multi-processors has a dedicated scratchpad memory to be shared by the subprocessors (i.e., lanes). This type of scratchpad memory is sometimes called a shared memory, which has a different meaning from when the term "shared memory" is used for a CPU device.

Figure 1:
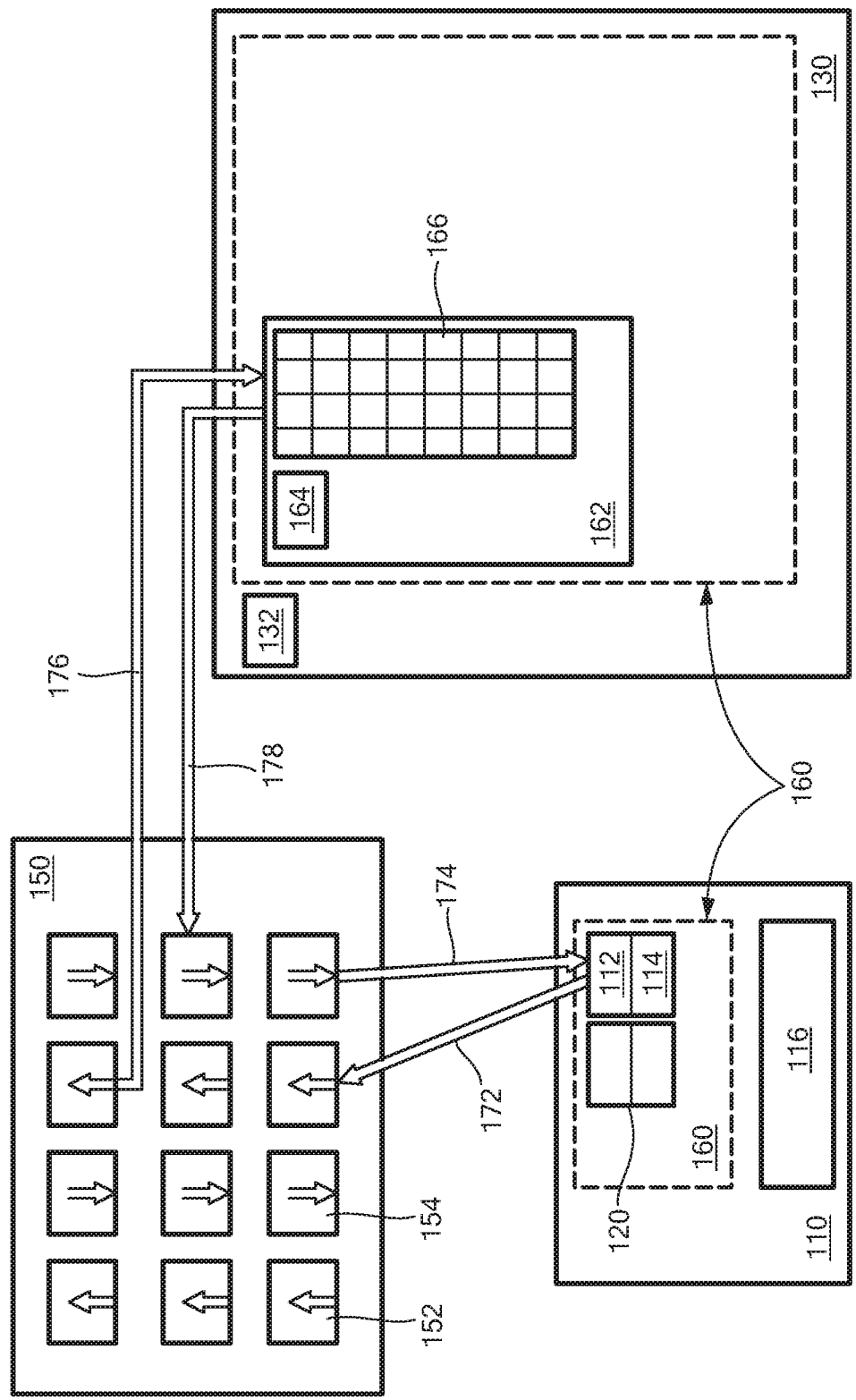
FIG. 1 is an illustrative block diagram of a heterogeneous CPU/GPU system for accelerating dataflow signal processing according to the concepts described herein.

Referring now to FIG. 1, a system 100 may comprise a CPU device 110 and a GPU device 130. The CPU device 110 may comprise one or more processors 120 and memory 116. Each of the processors 120 comprises a core 112 and private cache 114. The GPU device 130 also may comprise one or more vector processors 166 and memory 132, 164. The vector processors 166 may use a scratchpad memory 164 and shared cache 132. According to the concepts described herein, the system 100 may present the CPU device 110 and the GPU device 130 as a virtual compute cluster 160 of homogeneous processors which allow passing information between its processors. That is, the system 100 may interact with the resources in the CPU device 110 and the GPU device 130 for certain functionalities through the same interface. The processors (and their cores) and memory elements of the CPU device 110 and the GPU device 130 may be grouped as tiles 162 in a virtual tile cluster 160. A tile comprises at least one processor 112, 164 and a memory element 164. In the CPU device 110, the memory element may comprise private cache 114 for each core 112. In the GPU device 130, the memory element may comprise a portion of scratchpad memory 164 divided and distributed to each tile 162. The tiles according to concepts described herein may function like CPU cores at the algorithmic level as well as the communication infrastructure level. In addition, the tiles may be considered as independently addressable vector processors with their own local memories. In embodiments, a tile in a GPU may comprise a vector processor as its main processor. The GPU tile may further comprise one or more subprocessors, which are scalar processors 166 in the GPU.

In embodiments, GPU hardware comprises multiple processing cores called streaming multiprocessors (SMs). Each SM may contain dedicated on-chip resources, such as register file, scratchpad memory, and L1 cache. Some GPUs may contain 2 or more SMs which is how GPU models scale for different markets, form factors, and power conditions. Each SM may contain a collection of scalar cores which have more in common with CPU vector lanes than full CPU cores. The scalar cores of GPU are partitioned into groups of 32, for example, called warps (or sometimes referred to as "wavefronts"). Warps are the lowest independently schedulable level entity on the GPU, and therefore are analogous to CPU threads. Each of the 32 threads of a warp shares an instruction pointer and therefore may operate in lockstep in a similar way to the single instruction multiple data (SIMD) vector units of a CPU.

In embodiments, each of the warp-sized tiles may form a tile engine 162 in the virtual tile cluster 160. Each tile engine 162 may be viewed as a vector processor with 32-lanes of scalar processing elements, where the scalar processing elements 166 are considered as subprocessors. In some embodiments, a tile may have more or less than 32-lanes of scalar processing elements. These lanes have more autonomy than traditional vector lanes on a CPU since their control flow can diverge and the tile engines can access disjoint memory (i.e., distributed scratchpad memory 164 or the GPU global memory) on the GPU. The tile engine 162 can also communicate using efficient on-chip register shuffle instructions. In contrast to traditional CUDA thread blocks which are ephemeral (i.e., does not maintain resources persistently), the tile engine is persistent and does not relinquish underlying GPU resources.

A virtual unified memory 150 may be formed, for directing work to individual tiles, out of combined memory elements of the CPU device 110 and the GPU device 130. The virtual unified memory 150 may comprise a set of fixed capacity rings 152, 154 that are shared across the CPU and GPU devices 110, 130. The rings 152, 154 may be partitioned into two sets: multiple-producer single-producer (MPSC) ingress rings (CPU/GPU to GPU) 152 and MPSC egress rings (from GPU to CPU) 154. Each tile engine 162 may be associated with one ingress ring and one egress ring when the system starts up. In some embodiments, the virtual unified memory 150 may comprise more than one ingress ring and more than one egress ring. In another embodiment, each of tile engines 162 may have a dedicated ingress ring and/or egress ring.

The virtual unified memory 150 may be accessible from the device 110 and the GPU device 130. That is, the CPU device 110 and the GPU device 130 both may access the ingress ring 152 and egress ring 154 through a set of operations 172, 174, 176, 178. Herein, the CPU device 110 may insert (172) information (e.g., a task or token) in a slot of the ingress ring 152. The CPU device 110 may also dispatch (174) information from a slot of the egress ring 154. Similarly, the GPU device 130 may insert (178) information in a slot of the egress ring 154. The GPU device 130 may also pull (176) information from a slot of the ingress ring 152. In embodiments, the virtual unified memory 150 may create a virtual interconnect, such as message channels, task pools, mailboxes, and other communication structures shared by the CPU and GPU devices 110, 130. The virtual unified memory 150, as a virtual interconnect, may form a logical communication layer on top of a physical interconnect between the CPU device 110 and the GPU device 130 and corresponding system elements, such as the GPU memory management unit (MMU), page migration engine, and Direct Memory Access (DMA) engine.

A "compute kernel" (hereinafter simply a "kernel") is a software routine that is compiled particularly for high throughput accelerating hardware, such as a GPU or a Digital Signal Processor (DSP). The kernel is not an application that is typically running on a CPU but may be used by the application. In embodiments, the kernels (i.e., GPU programs herein) may be launched by sending requests to a GPU scheduler in the GPU device 130 through the virtual interconnects. By doing so, traversing the stacks of the GPU runtime framework (e.g., CUDA) and GPU drivers may be avoided. In particular, entering and exiting the GPU driver may be avoided, since the entering and exiting the GPU driver causes switching between user space and kernel space. Thus, there is a reduced (preferably 'minimum') latency cost with requesting execution of the kernels. In embodiments, a kernel is implemented as a 'codelet' which refers a small and simple procedure, program or application compiled and executed on the GPU.

Figure 2:
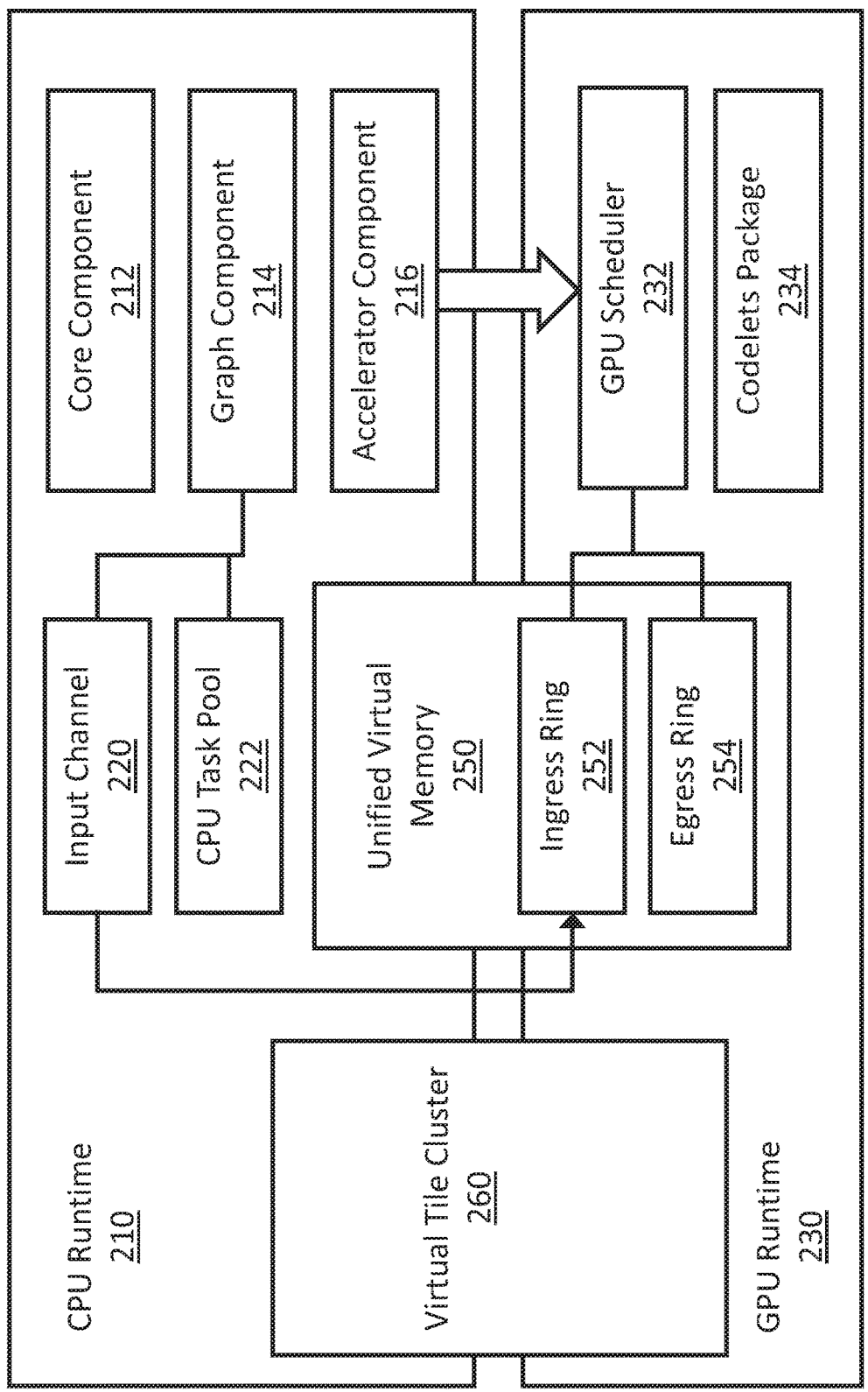
FIG. 2 is an illustrative block diagram showing an architecture of the heterogeneous CPU/GPU system in FIG. 1 according to the concepts described herein.

Referring now to FIG. 2, a system 200 may comprise a CPU runtime 210 and a GPU runtime 230. The CPU runtime 210 refers software elements running on a CPU device (e.g., 110 in FIG. 1). The GPU runtime 230 also refers software elements running on a GPU device (e.g., 130 in FIG. 1). The CPU runtime 210 may comprise a core component 212, a graph component 214, and an accelerator component 216. The core component 212 may provide functions that are needed internally by the other components 214, 216. In embodiments, the core component 212 may provide lock-free data structures, thread synchronization primitives, and buffer management classes. The core component 212 may not be used directly by the users of the system 200. The graph component 214 may provide functions related to the task management. In embodiments, the graph component 214 may provide dataflow graphs, specializing nodes, and registering data buffer pools. The accelerator component 216 may serve as a bridge between the CPU runtime 210 and GPU runtime 230. In embodiments, the accelerator component 216 may provide interfaces to the graph component 214 for offloading task executions to tiles in the GPU runtime 230. The CPU device may also comprise one or more input channels 220 and a CPU task pool 222 that will be described in detail below.

In embodiments, the system 200 may use a dataflow mechanism and a producer-consumer pattern for implementing the task management of the system 200. The dataflow architecture may construct a static graph representing the sequenced computations of an application that manipulates data contained in buffers. The buffers in an application flow through the graph nodes in a predefined order. The dataflow of the buffers starts in a source node and go through transformation in processing nodes, and end their lifecycle in a sink node, where resources such as buffers are recycled. The nodes are linked together by unidirectional buffer channels called ports or channels. The order of processing implies producer-consumer relationships and therefore data dependencies between nodes in the graph. For example, the system may have two nodes each containing one input and one output port. The output port of one node may be linked to the input port of the other node in which case there is an implied data dependency between the two nodes with the first node playing the role of producer and the other node playing the role of consumer. During execution, the runtime will execute the computation on a buffer in the first node and pass it to the output port. Since this output port is connected to the input port of the second node, that node will become active and the runtime will execute its computation. The buffers are modified in a series of computational stages embedded in the nodes which are connected via their ports to form a dataflow graph. In the dataflow architecture, at least one source node to inject new buffers into the system and at least one sink node to recycle buffers that reach the end of their lifecycle should be provided. In embodiments, source and sink nodes in production systems are often implemented as network endpoints that form the external interfaces of the dataflow graph. Herein, an input channel 220 of a node works as a starting point of the processes described in FIGS. 5-6. The processes start when a buffer (e.g., a task) arrives at the input channel 220.

The system 200 may present the CPU runtime 210 and the GPU runtime 230 as a virtual compute cluster of homogeneous processors. The processors and memory elements of the CPU runtime 210 and the GPU runtime 230 may be grouped in a virtual tile cluster 260. A tile in the virtual tile cluster 260 may comprise at least one main processor and memory. The tiles may be considered as independently addressable vector processors with their own local memories.

In embodiments, the GPU runtime 210 may present the GPU device (e.g., 130 in FIG. 1) not as a massively wide vector processor operating on bulk data, but rather as a collection of independent tiles (i.e., virtual tile cluster 260) each mapped to a physical warp in hardware. For example, for a GPU having 5,120 cores (80 SMs×2 warps×32 scalar cores), the GPU runtime 230 does not behave as a device with 5,120 cores operating in SIMD (single-instruction single-data) over a dataset, but behave as a virtual cluster of 160 independent 32-lane vector processors in a shared memory system operating in MIMD (many-instructions many-data). That is, the 5,120 cores GPU may be viewed as 160 tile engines, where each tile engine comprises a vector processor and 32 subprocessors (lane or scalar processors). Accordingly, parallel algorithms implemented with shared-memory or message-passing programming models such as OpenMP (Open Multi-Processing) or MPI are more easily ported to the GPU. To be consistent with this architecture, any existing CUDA kernels are required to be converted to a set of tasks implemented as warp-level codelets. In embodiments, private scratchpad memory (sometimes referred as shared memory by NVIDIA) in each SM of the GPU runtime 230 are partitioned across the tiles so that each tile has an equal portion of the memory. For example, if each SM has 64 KiB of dedicated on-chip scratchpad memory and consists of 4 warps, the runtime will reserve 16 KiB of exclusive on-chip scratchpad memory per tile.

A virtual unified memory 250 may be formed, for directing work to individual tiles, out of combined memory elements of the CPU runtime 210 and the GPU runtime 230. The GPU runtime 230 may work in concert with the CPU runtime 210 to implement shared fixed-capacity ring buffers in the virtual unified memory 250, such as ingress ring 252 and egress ring 254. In some embodiments, the virtual unified memory 150 may comprise more than one ingress ring and more than one egress ring. These rings are designed for very high throughput and internally make use of system-wide atomic operations and memory fences on both the CPU and GPU for low latency and scalability. All ring slots are aligned on cache-line boundaries which means that the size of ring slots is determined based upon cache-line size for performance reasons. The rings may impose a FIFO (first-in first-out) ordering, and each end of a ring may be optimized depending on whether it expects multiple or single clients. The dataflow framework is capable of constructing an arbitrary network of directional rings to simulate various kinds of virtual interconnects, such as peer-to-peer channels, single-consumer mailboxes, or a fully-connected mesh. In embodiments, any number of rings, of any size, and with any slot capacity can be created to be customized and tuned for a specific application. Since the ingress ring 252 and egress ring 254 are allocated in the virtual unified memory 250 that is accessible by the CPU runtime 210 and the GPU runtime 230, pointers of ring slots passed between the CPU and GPU are valid and may be accessed without explicit memory transfers. In some embodiments, some GPUs may have hardware page-migration engines that move data at page-granularity across the physical interconnect (i.e., PCIe, NVLink) in response to page faults.

The input channels 220 may receive a task from an external element (e.g., a server or a user interface). In embodiments, developers of the system 200 may register the types and quantity of data buffers that will be used in applications using a graph interface provided by the graph component 214. The buffer type may incorporate both the sized scalar type as well as the dimension of the vector. All buffers are pre-allocated to avoid system heap allocations at runtime. Heap allocations in the data path of an embedded application may introduce substantial latency. Instead, the runtime manages requests for buffers and recycles the requests when they are no longer needed. The buffers are allocated from the unified virtual memory 250 which is visible to both the CPU and GPU devices. This enables buffer pointers to be passed and accessed transparently by the CPU and GPU without the need for explicit DMA commands to copy data to and from the data buffers. In embodiments, all buffers are aligned on cache-line boundaries for performance reasons.

The system 200 may spawn one I/O-bound thread called an actor (e.g., 310 in FIG. 3) within each graph node generated by the graph component 214. The actor may be tasked with blocking on the input channel 220. When a task is received at the input channels 220, the actor thread offloads the computation on the buffers to either a CPU task pool 222 managed by the CPU device or to a GPU device via the accelerator component 216. The actor then may be suspended, consuming no CPU cycles until the CPU task pool or GPU finishes execution of the offload request and notifies the actor completion of the task.

In embodiments, the CPU task pool 222 is used to avoid oversubscription of the CPU runtime 210. The number of threads executing in the CPU task pool 222 does not exceed the available hardware concurrency (i.e., the number of concurrent threads) on the CPU runtime 210. In some embodiments, the task pool 222 can be configured so that threads actively spin when idle or park until any resource becomes available. For example, the CPU task pool 222 may be configured such that threads spin to minimize latency at the expense of power consumption. A task offloaded to the CPU task pool 222 runs to completion on an available task pool thread. In embodiments, since the task in the CPU task pool 222 is not preempted (i.e., interrupted), the task should not include blocking operations as that would tie up a valuable CPU resource. The CPU task pool 222 is designed to accelerate compute-bound computations only.

In embodiments, developers of the system 200 may create tasks for processing nodes in a data-parallel style similar to OpenMP interface. If there is no inherent parallelism within a computation, the task may be implemented as a serial function. Accordingly, an application focusing on testing system behavior may be easily implemented using this architecture. When one of the nodes generated by the graph component 214 is found to be compute-bound, the node can be optimized by implementing the logic as fine-grained tasks and offloaded to the CPU task pool to reduce latency. When a node is compute-bound, the time for the node to complete a task is determined mainly by the speed of the central processor, thus processor utilization is high and interrupts generated by peripherals (e.g., hard disk) may be processed slowly, or substantially delayed. In embodiments, parallelism in computing may exist on two levels in the dataflow graph. Distinct graph nodes may execute concurrently once all input channels 220 become active. The only constraint on parallel execution may come from data dependencies between nodes. On another level, the internal logic of each processing node may expose data parallelism and when converted to appropriate tasks can be accelerated with the CPU task pool.

The GPU runtime 230 may comprise a GPU scheduler 232 and a codelets package 234. The GPU scheduler 232 may perform functions for executing tasks in the GPU runtime 230, which will be explained in detail below. The codelets package 234 is a static library of GPU programs developed for an application to be executed by the system 200. The codelets in the codelets package 234 are implemented as GPU device functions each sharing a common function signature. In embodiments, implementation of the GPU runtime 230 may depend on an application framework, such as CUDA and Khronos OpenCL, provided by GPU vendors. Particularly, the GPU runtime 230 is linked to the runtime library in the application framework of the GPU vendor which exposes an abstract accelerator interface capable of supporting non-GPU devices. In embodiments, the GPU runtime 230 may provide an API to enable the user to register their codelets with the scheduler and also package up these codelets into codelets package 234 which are separately compiled.

In embodiments, any thread on the CPU runtime 210 and any tile engine in the virtual tile cluster 260 may push work requests (i.e., tasks) on any ingress ring 252 enabling full point-point communications across the heterogeneous system (CPU/GPU). Accordingly, a task is produced to be performed by tile engines in the virtual tile cluster 260. In some embodiments, the first 8 bytes of each task may contain an opcode which the GPU scheduler 232 uses to dispatch the task to the appropriate GPU tile at runtime. In other embodiments, the size of the opcode may be different from 8 bytes and the opcode may be located at other places than the first part of the task. The remaining bytes of the task may contain the arguments and data needed by the task. In some embodiments, because the ingress ring 252 exists in shared virtual managed memory, the CPU runtime 210 can pass pointers as task arguments and the GPU runtime 230 may page fault to bring the pages into GPU memory upon pointer access. Accordingly, it is not necessary to explicitly manage memory transfers in this programming model, though nothing prevents a user from pre-allocating non-pageable memory and using the GPU DMA functions to fetch task arguments as part of task execution. Upon dispatch, a task-specific codelet is executed on the tile engine. The task always receives the allocation of the on-chip scratchpad memory of the tile for their use. When a task is executed on a tile, the tile may use the private scratchpad memory assigned to the tile.

The GPU scheduler 232 may bypass the hardware scheduler provided by the manufacturer of the GPU (e.g., NVIDIA GPU scheduler). In embodiments, the GPU scheduler 232 may launch as many threads as necessary to implement the number of tiles in a chosen tile configuration. Those threads may be further partitioned into warp-sized tiles. In some embodiments, the GPU scheduler 232 may place the first thread of each tile, called the leader, in charge of interacting with an ingress ring 252. The leader may consume tasks from the ingress ring 252 and then dispatch on the task opcode to the appropriate task codelet. Each tile engine lane (including the leader) may then process the task and will be given identifying information that the tile can use to determine what action to take based on its identity within the engine. In general, each lane will assign itself a subrange of data that is divided by the GPU scheduler 232 to process in parallel to avoid having to synchronize with other lanes. When there is no request on the ingress ring, the leader blocks operation of its corresponding tile. In embodiments, only the leader lane of each tile engine may consume tasks from the ingress ring 252, but any engine lane can produce tasks (e.g., completion token) on the egress ring 254. In some embodiments, the leader lane may produce tasks on any ingress ring in the system. This production of tasks may include the self-scheduling of tasks on the same tile engine. In other embodiments, any lane, when the GPU supports the feature, may produce tasks on any ingress ring in the system.

When a task arrives on the ingress ring 252, the leader may broadcast the task to subprocessors (i.e., scalar processors) that belong to the tile by broadcasting a ring slot pointer to each peer thread in the tile. Then, each subprocessor including the leader of the tile may execute the requested codelet in parallel. The subprocessors are identified within a tile by a unique identifier called a rank. If a request received from the ingress ring 252 is a special command to halt the GPU scheduler 232, the leader broadcasts (using a GPU shuffle instruction) the halt status to each peer and the tile terminates operation. Once the codelet associated with the task is executed, all peer threads in the tile may synchronize and the leader may send a completion token to an egress ring 254 such that an actor that is a suspended CPU thread responsible for the task request can be woken up. The GPU scheduler loop may repeat until the CPU runtime sends a halt command which occurs as part of the termination protocol (e.g., a poison pill).

In embodiments, the GPU runtime 230 uses the warp shuffle instruction to broadcast the task to the subprocessors. Accordingly, using valuable scratchpad memory to share scheduler state may be avoided. By making use of warp-level instructions, the resources of the GPU may be preserved for use exclusively by codelets. Since warp instructions operate at the register level, the warp instructions consume no memory bandwidth and so are much more efficient than using the scratchpad memory.

In embodiments, offloading a task through the CPU task pool 222 and the accelerator component 216 may provide distinct interfaces. Thus, developers may be required to choose which offload engine they will use. In some embodiments, the two mechanisms may be merged to offer the same tile and local memory abstraction. Herein, the CPU runtime 310 may present CPU cores as tiles with 1-lane vector processors (effectively scalar processors). Additionally, a shared memory in the CPU runtime 210 may emulate the concept of a scratchpad memory in the GPU runtime 230.

For example, cache-line locking may be used if the CPU supports it. Accordingly, the same codelet may work on both CPU and GPU tiles and would present a common programming model across all compute elements in a heterogeneous system. This would also enable CPU and GPU tiles to work cooperatively at the level of tasks to accelerate computation on large datasets.

When the tile engines in the virtual tile cluster 260 are busy processing incoming tasks, the system 200 may need a mechanism to halt the tile engines without dropping pending tasks or interrupting tasks that are currently being executed. In some embodiments, a reference implementation of distributed termination detection algorithms, such as a simple poison-pill protocol may be used. Herein, a user may place a halt task (the poison pill) into each tile engine ingress ring 252. Upon receiving the halt task, the GPU runtime 230 engine may exit the GPU scheduler 232. The CPU runtime 210 then may enter a system-wide barrier to wait for the thread blocks (hosting the tile engines) to terminate at which point the CPU thread is unblocked.

Figure 3:
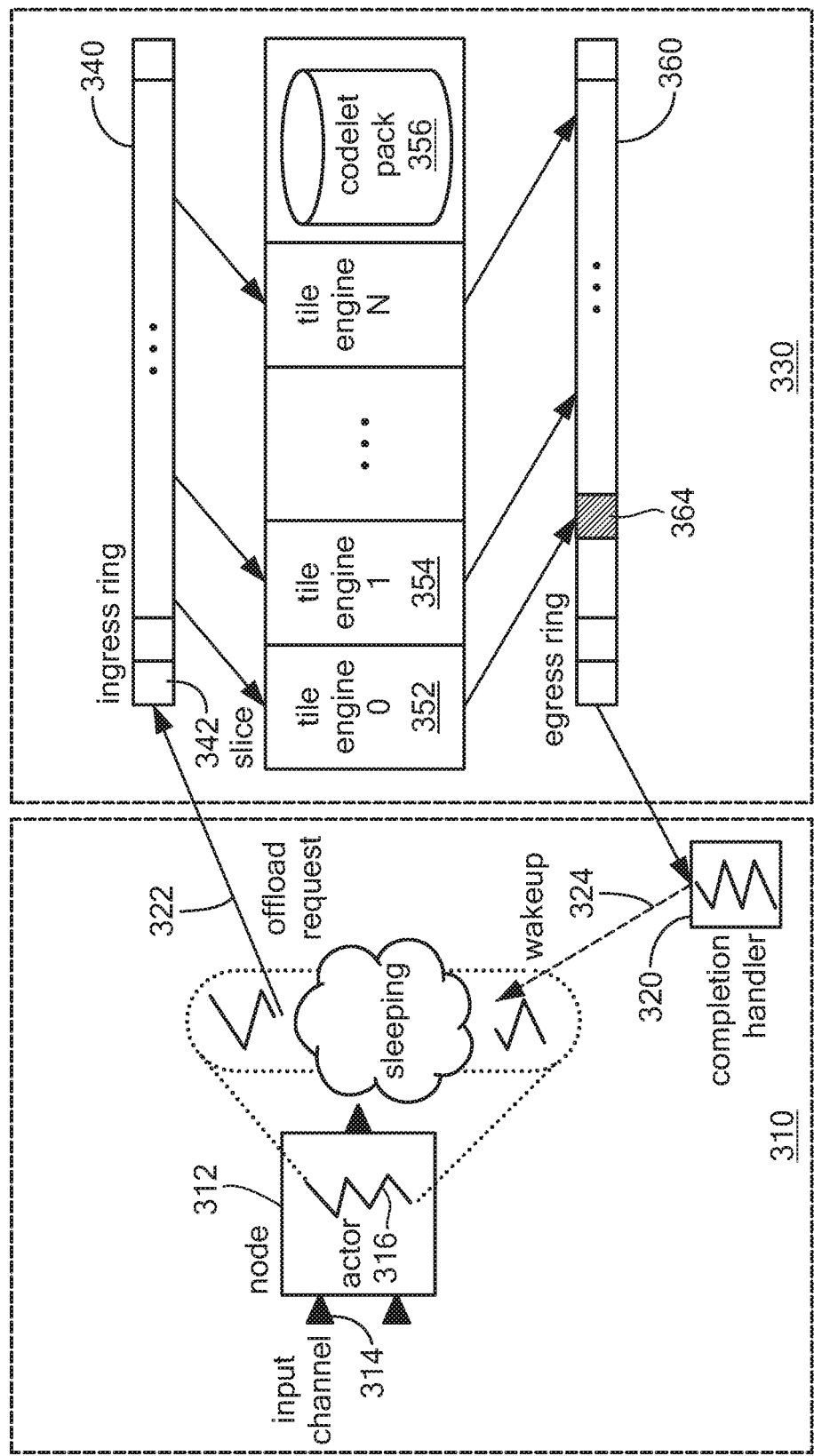
FIG. 3 is a block diagram showing the sequence of an offload request to the GPU runtime according to the concepts described herein.

Referring now to FIG. 3, the sequence of an offload request to the GPU runtime 330 is presented. When a task is received at an input channel 314 of a node 312, a thread 316 corresponding to the task is assigned to the task. In embodiments, thread creation is done at start-up of the GPU runtime, and an available thread is assigned to an incoming task. According to pre-defined rules, the task may be determined to be offloaded to the GPU runtime 330. In a GPU offload request 322, the CPU runtime 310 may transfer information related to the offload request to a slot 342 of an ingress ring 340 in the unified virtual memory (e.g., 250 in FIG. 2). In embodiments, the CPU runtime 310 may marshal a codelet descriptor, pointers to data buffers, and any scalar parameters the codelet requires, into the slot 342 of the ingress ring 340. A codelet (not shown) corresponding to the task has been compiled into the codelet package 356 which has been loaded into the GPU runtime 330 as part of application start-up.

In embodiments, the thread 316 may suspend itself as the task is offloaded to the GPU runtime 330. The thread 316 may wait until the GPU runtime 330 has finished execution of the requested codelet. When a tile 352, 354 assigned to the task completes execution of the task, the tile may deposit a completion event or a completion token 364 on an egress ring 360. The completion token 364 is used to inform the thread that the offload request is completed, and the node thread can wake up. In embodiments, the GPU runtime 330 does not directly communicate to a thread running in the CPU runtime 310. That is the GPU runtime 330 cannot send a signal or interrupt to the thread 316 that the task is done. Accordingly, the CPU runtime 310 needs a mechanism to check the status of the GPU runtime 330 to determine completion of the offload requests. A completion handler thread 320 in the CPU runtime 310 may perform this function. The completion handler 320 may check the egress ring 360 for a completion token on behalf of all nodes running in the CPU runtime 310. The completion handler 320 may handle each completion token on the egress ring 360 to wake up 324 the corresponding node thread 316. Accordingly, one polling thread (i.e., completion handler 320) in the CPU runtime 310 may handle completion of tasks instead of one per offload request. In some embodiments, if the GPU runtime supports a suitable CPU signaling mechanism, the CPU signaling mechanism may be used instead of the completion handler 320. In some embodiments, each completion token may include a reference to a barrier to the CPU runtime 210 associated with the requesting CPU thread. When the completion token is dispatched, the associated barrier may be also unblocked upon receipt of the token, allowing the CPU thread to continue processing.

The GPU runtime 330 may provide abstract concepts such as tiles 352, 354 with local memories instead of physical GPU device features such as warps, SMs, scratchpad memories, or scalar cores. In some embodiments, a subset of the total number of tiles available called a 'slice' may be used. The slice may be composed of from one to the maximum number of tiles available on the GPU runtime 330 according to a configuration. Herein, the GPU runtime 330 executes codelets on the slice, not on a tile beyond the slice. Using a smaller subset of tiles could be used to reduce power consumption on the GPU or enable multi-tenant scenarios where a vendor library or other runtime could make use of the GPU resources outside of the reserved slice.

Figure 4:
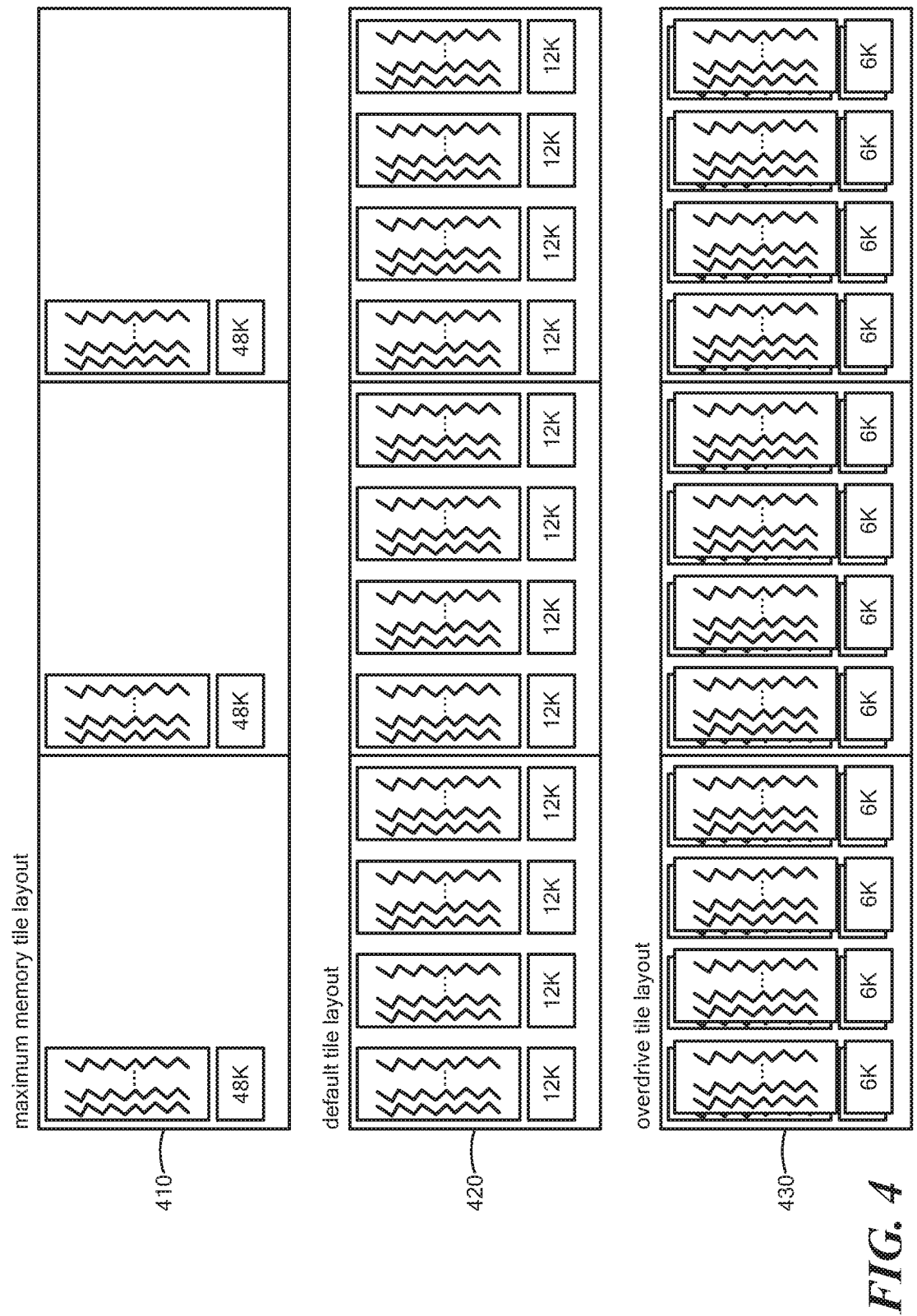
FIG. 4 is a block diagram showing different GPU tile layouts according to the concepts described herein.

Referring now to FIG. 4, different GPU tile layouts are presented. The GPU runtime (e.g., 230 in FIG. 2) is highly configurable and supports various tile configurations depending on the scratchpad memory or throughput requirements of the codelets. FIG. 4 presents exemplary tile configurations assuming a hypothetical GPU with 3 SMs. The first configuration 410 may maximize the scratch-pad memory per tile at the cost of reduced throughput capacity. Herein, one tile is enabled per SM while this configuration could leave several warps worth of scalar cores unused in the SM. The second configuration 420 may create as many tiles as possible to exactly cover the number of scalar cores on each SM. Herein, the scratchpad memory is partitioned across those tiles accordingly. This configuration may expose all the SM resources to the GPU runtime (e.g., 230 in FIG. 2) but scratchpad memory will be more limited as compared to the maximum memory configuration 410. The overdrive configuration 430 may oversubscribe the underlying scalar cores by doubling the number of tiles visible to the GPU runtime. This configuration generally achieves the highest throughput since the GPU hardware (unlike CPU threads) can switch between warps with zero cost when the warps stall on GPU DRAM accesses. Herein, the scratchpad memory allocations per tile are half the size per tile as compared to the default configuration 420.

Figure 5:
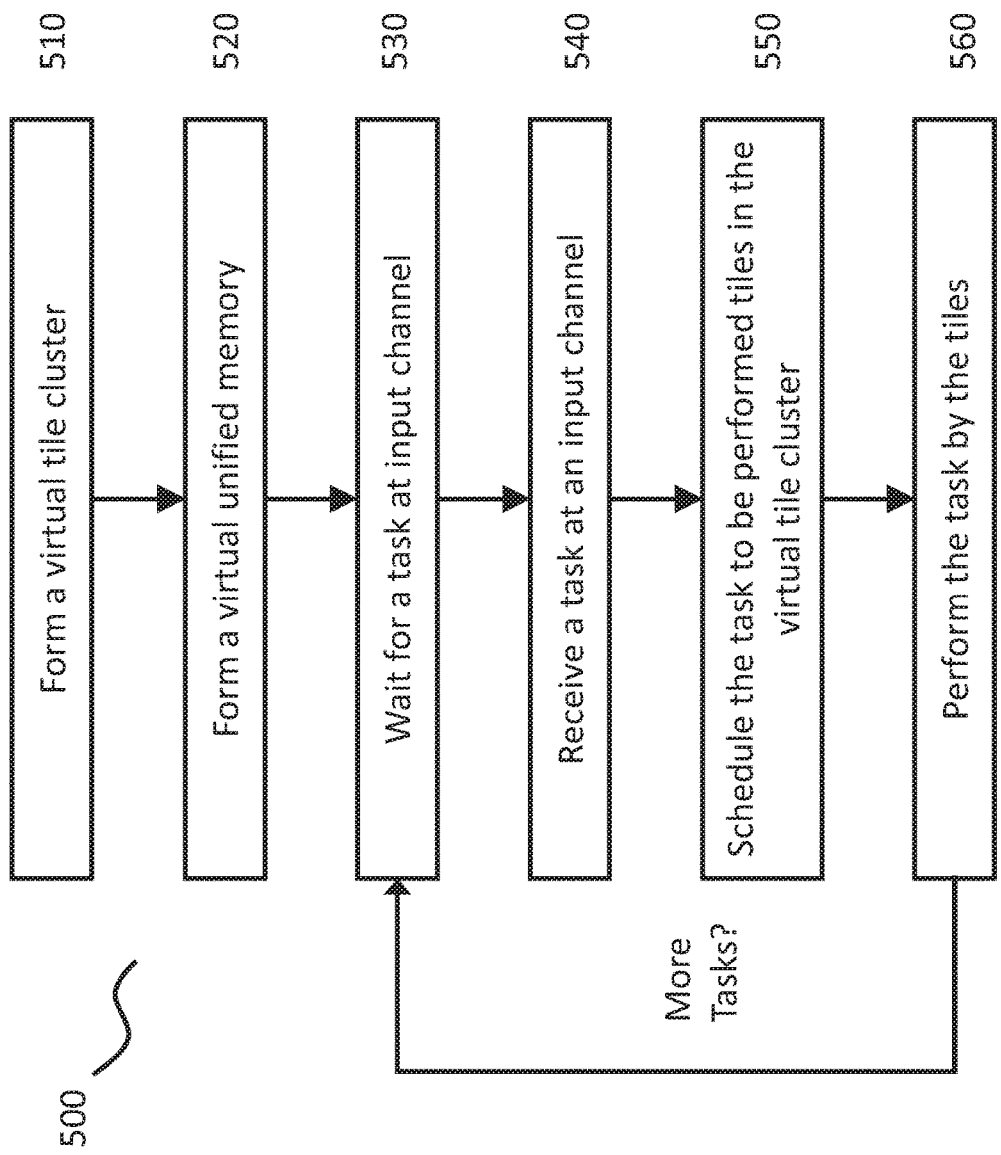
FIG. 5 is a flowchart of an accelerated dataflow signal processing according to the concepts described herein.
Figure 6:
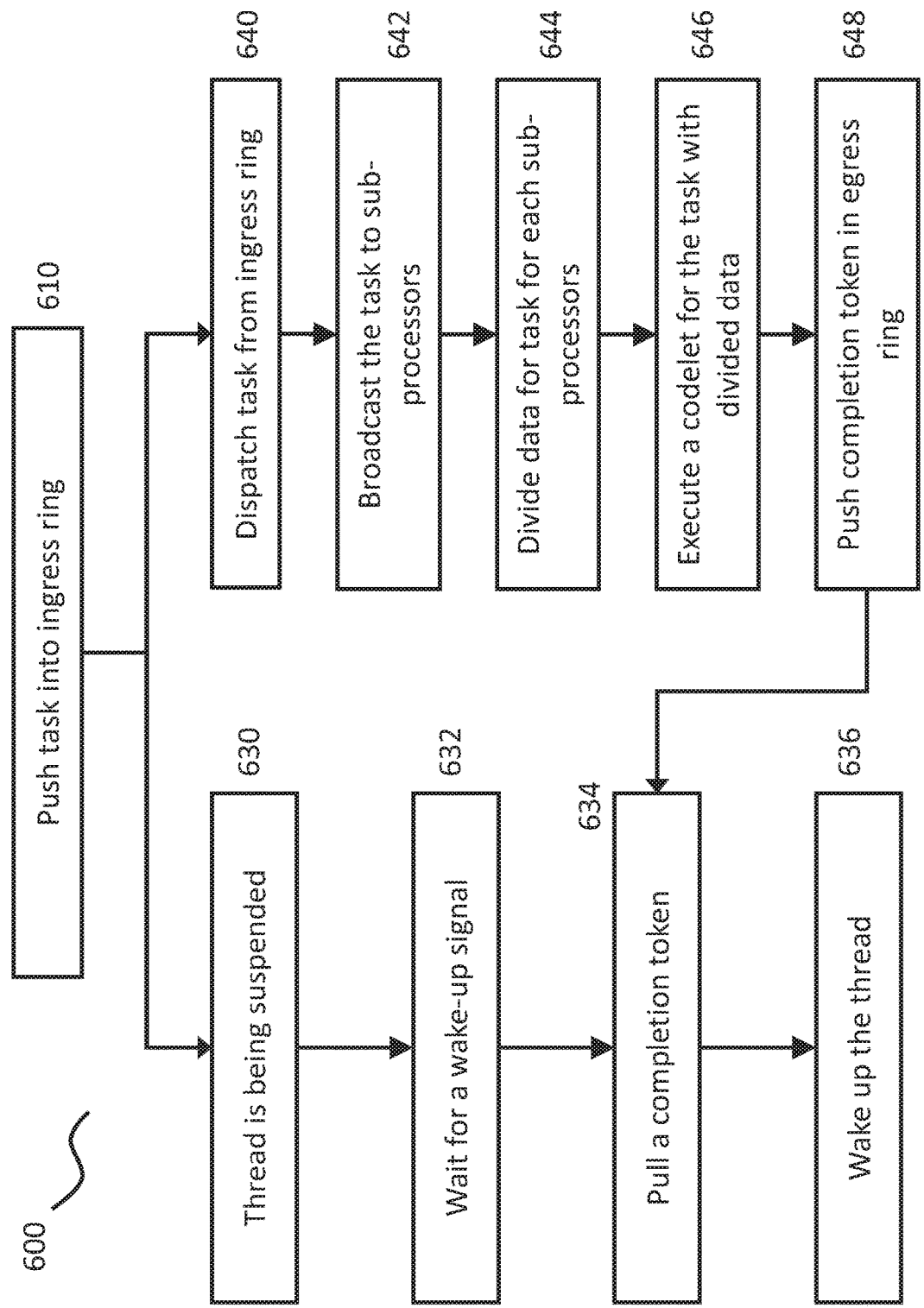
FIG. 6 is a flowchart for offloading a task to a GPU runtime according to the concepts described herein.

FIGS. 5 and 6 are flow diagrams illustrating the processing performed by the CPU runtime and GPU runtime (e.g., 210 and 230 in FIG. 2). Rectangular elements (typified by element 510 in FIG. 3), herein denoted "processing blocks," represent computer software instructions or groups of instructions and diamond shaped elements (not shown), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 5, a process 500 for accelerated dataflow signal processing may be carried out by a system (e.g., 200 in FIG. 2) comprising a CPU runtime (e.g., 210 in FIG. 2) and GPU runtime (e.g., 230 in FIG. 2). In processing step 510, the system 200 may form a virtual tile cluster (e.g., 260 in FIG. 2) out of cores and memories of a CPU device (e.g., 110 in FIG. 1) and a GPU device (e.g., 130 in FIG. 1). The tiles in the virtual tile cluster may function like CPU cores both at the algorithmic level as well as the communications infrastructure level. The tiles may be considered as independently addressable vector processors with their own local memories. In processing step 520, the system may form a virtual unified memory (e.g., 250 in FIG. 2) that is accessible from both the CPU runtime and GPU runtime. In processing step 530, the CPU runtime may wait for a task at an input channel or an input port (e.g., 220 in FIG. 2). There may be one or more input channels at one or more nodes created in the CPU runtime. When a task arrives at an input channel (processing step 540), the CPU runtime may assign the task to at least one tile in the virtual tile cluster. The tile may be located in the CPU device or the GPU device. If the task is assigned to a tile in the CPU device, the task is inserted into a CPU task pool (e.g., 222 in FIG. 2). If the task is assigned to a tile in the GPU device, the task is offloaded to the GPU runtime via an accelerator component (e.g., 216 in FIG. 2). The process of offloading a task is described in detail in process 600 in FIG. 6. In processing step 560, the task is executed by the assigned tile. Then, the CPU runtime may continue to wait for more task (processing step 530) until the system is instructed to stop by a termination protocol, such as a poison pill.

Referring now to FIG. 6, a process 600 for offloading a task to a GPU runtime (e.g., 230 in FIG. 2) may be carried out by a system (e.g., 200 in FIG. 2) comprising a CPU runtime (e.g., 210 in FIG. 2) and GPU runtime. In processing step 610, the CPU runtime, via the accelerator component (e.g., 216 in FIG. 2) may insert the task into a slot in an ingress ring (e.g., 252 in FIG. 2). The CPU runtime may also transfer information including data for the task to execute the task to the ingress ring. In some embodiments, an object corresponding to the task may contain the related information. The CPU runtime may create or assign a thread (e.g., 316) corresponding to the task. In processing step 630, the CPU runtime may put the thread on hold. In processing step 632, the actor is waiting for a wake-up signal. The task inserted into a slot of the ingress ring is dispatched by the GPU runtime in processing step 640. In processing step 642, the GPU runtime, particularly the GPU scheduler (e.g., 232 in FIG. 2), broadcasts the task to subprocessors in the assigned tile using a GPU warp shuffle instruction. In embodiments, one shuffle instruction may broadcast the task to subprocessors. In embodiments, the subprocessors may be scalar processors. In processing step 644, the GPU scheduler may divide the data for the task for each of the subprocessors and assign the divided data to each subprocessor. In processing step 646, each of the subprocessors may execute a codelet corresponding to the task using the assigned divided data. That is, each subprocessor executes the same codelet with a different partition of the divided data. In processing step 648, when execution of the task is done, the GPU runtime inserts a completion token in a slot in an egress ring (e.g., 254 in FIG. 2). In processing step 634, the CPU runtime may notice the completion token and pull the completion token from the egress ring. In embodiments, a completion handler (e.g., 320 in FIG. 3) may check the egress ring and pull the completion token. In processing step 636, the CPU runtime may wake-up the actor. In some embodiments, a barrier to the CPU runtime may be released when the actor is woken up.

Figure 7:
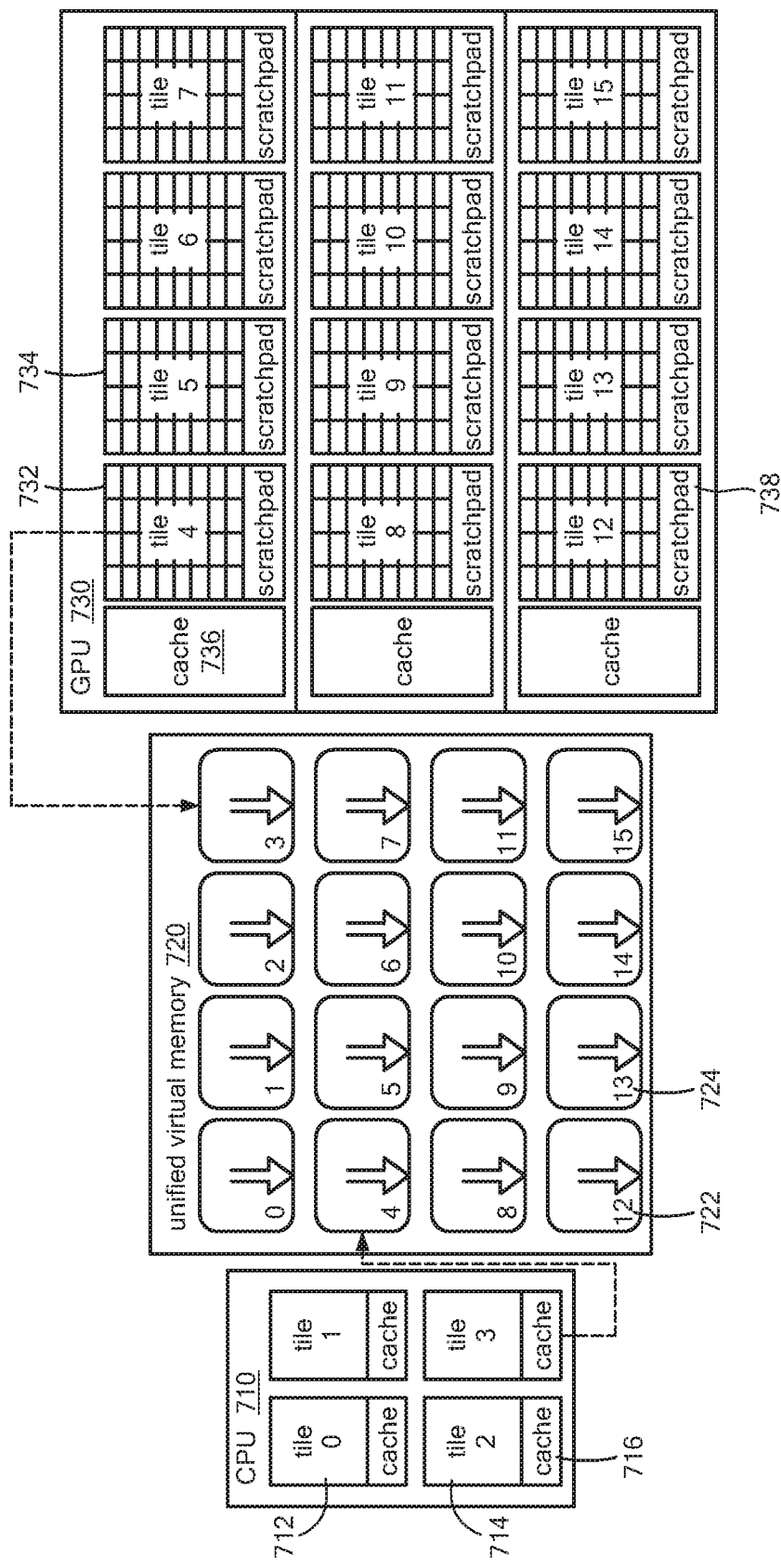
FIG. 7 is a diagram showing a configuration that emulates an actor network according to the concepts described herein.
Figure 8:
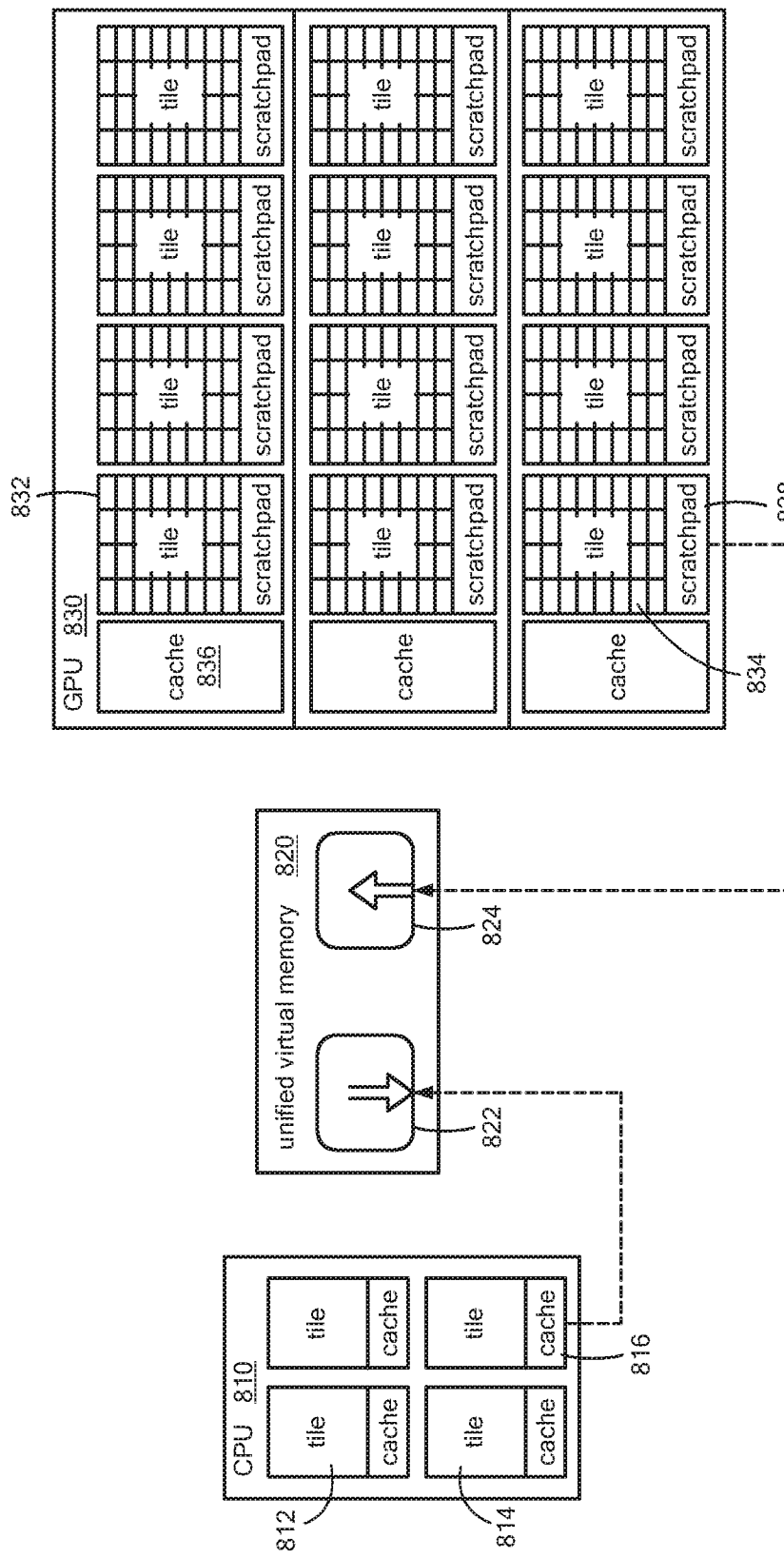
FIG. 8 is a diagram showing a simple virtual interconnect and tile layout according to the concepts described herein.
Figure 9:
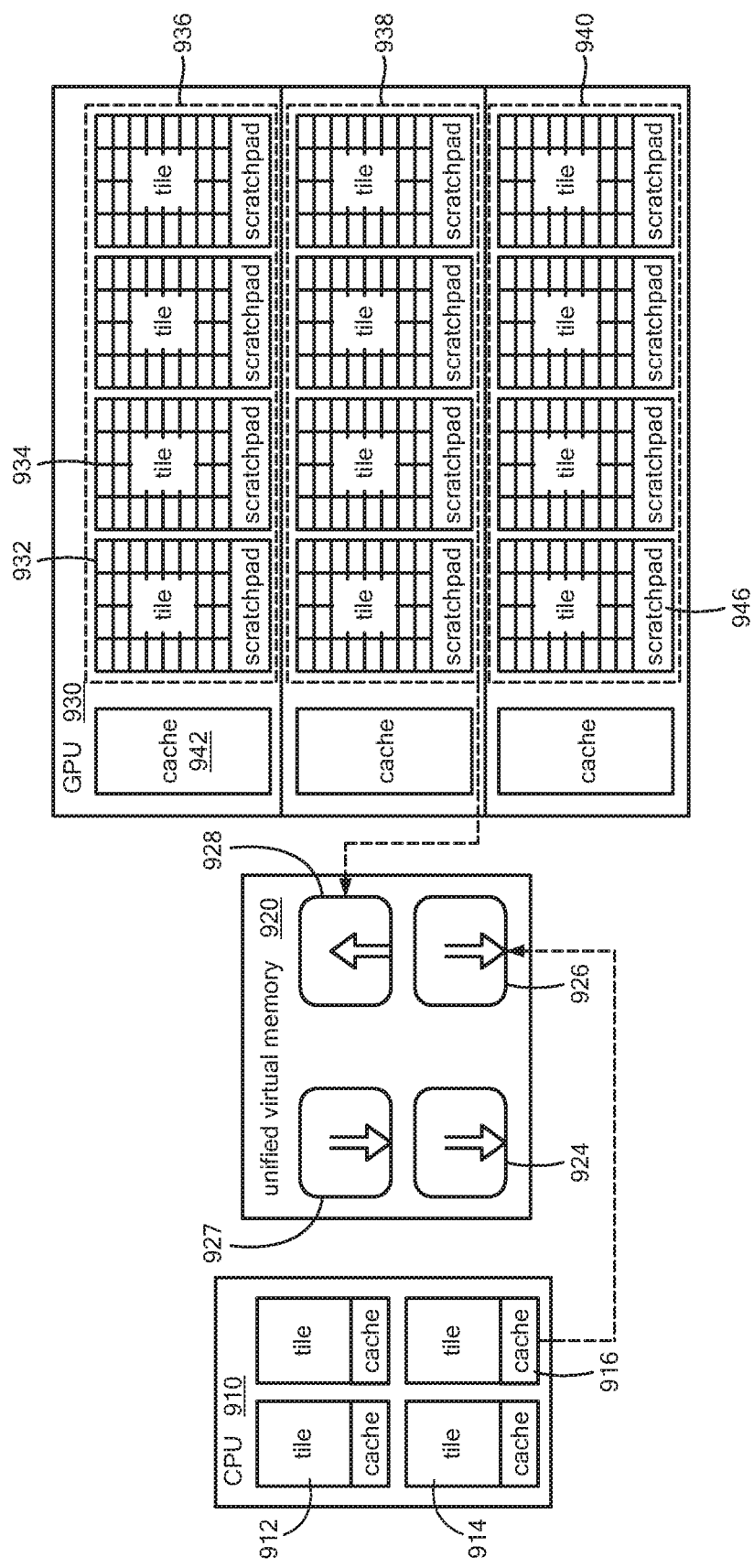
FIG. 9 is a diagram showing an alternative interconnect and tile topology according to the concepts described herein.

Referring now to FIGS. 7-9, the GPU runtime (e.g., 230 in FIG. 2) may be customized to implement a variety of virtual interconnect topologies and tile layouts depending on the requirements of an application. Choosing a virtual interconnect and tile layout may imply a particular execution model and may affect the implementation of GPU codelets as well as the organization of the dataflow application. FIGS. 7-9 describe exemplary runtime configurations with corresponding application use cases. In some embodiments, a combination of the use cases may be the most appropriate. The configurations may be determined based upon the processing needs of the GPU codelets used and the communication patterns employed among tiles.

Referring now to FIG. 7, a configuration that emulates an actor-network is presented. An actor in this context is a processing node with an associated mailbox. Each tile 712, 714, 732, 734 (as an actor) may accept codelet requests (i.e., tasks) on its mailbox and executes the requests sequentially. Herein, the sequence of execution of the incoming requests is maintained based upon the order of originating from the same source. In embodiments, a mailbox associated to each time may be implemented as a multiple-producer single-consumer ring 722, 724 in the unified virtual memory 720. The rings 722, 724 are unidirectional and may work similarly with an ingress ring (e.g., 252 in FIG. 2) that accepts codelet requests. The numbering of the tiles and rings in FIG. 7 illustrate that each tile is associated with a unique ring. Herein, tiles exist on both the CPU device 710 and the GPU device 730. Each tile 712, 714 in the CPU device 710 may have own cache 716. The tiles in the GPU device 730 may share cache 736 and also may have own scratchpad memory 738. Furthermore, any tile may send codelet requests to any other tile. For example, tile 3 on the CPU device may send a codelet request to the GPU tile labeled tile 4. After executing the codelet, tile 4 may send a codelet request back to tile 3. In some embodiments, dataflow applications may employ a programming model where each actor is a stage (i.e., a processing element in a pipeline that can execute concurrently) in a dataflow graph and each mailbox represents the associated input ports. In this model, the dataflow graph may be mapped directly onto this actor network. The dataflow graph may be executed by mapping all processing nodes in the graph to GPU tiles. This model is beneficial because doing so could substantially reduce end-to-end latency since the entire critical path of the dataflow graph executes on the GPU without CPU involvement.

Referring now to FIG. 8, a simple virtual interconnect and tile layout is presented. Herein, tiles exist on both the CPU device 810 and the GPU device 830. Each tile 812, 814 in the CPU device 810 may have own cache 816. The tiles in the GPU device 830 may share cache 836 and also may have own scratchpad memory 838. The virtual unified memory 820 consists of a single pair of ingress ring 822 and egress ring 824. Herein, a tile 812 in the CPU device 810 may initiate codelet requests on the ingress ring 822. All GPU tiles 832, 834, . . . may take and execute the codelet requests as the requests arrive via the ingress ring 822. After a GPU tile 834 executes a codelet, the tile 834 may place a completion token on the egress ring 824 where a completion handler (e.g., 320 in FIG. 3) in the CPU device 810 gets a notice. In contrast to the actor-network configuration in FIG.

7, the GPU tiles are anonymous. That is, a sender of codelet requests is not concerned with which specific GPU tile executes the request. This pattern of configuration may be called a 'task pool' or 'work crew' and is commonly found in server software. This configuration may be easily scaled out by upgrading to a more powerful GPU (or adding more GPUs) to host additional tiles.

Referring now to FIG. 9, an alternative interconnect and tile topology sharing qualities with both actor-network in FIG. 7 and task pool configuration in FIG. 8 is presented. Herein, tiles exist on both the CPU device 910 and the GPU device 930. Each tile 912, 914 in the CPU device 910 may have own cache 916. The tiles 932, 934 in the GPU device 930 may share cache 942 and also may have own scratchpad memory 946. The GPU tiles 932, 934, . . . are divided into partitions 936, 938, 940. Each of the partitions is assigned one or more codelets unique to that partition. Herein, each tile partition 936, 938, 940 is associated with a unique ingress ring 922, 924, 926 and all partitions share a single egress ring 928 in the unified virtual memory 920. This configuration may improve locality of the resources particularly when the partitions are aligned on meaningful hardware boundaries (such as a GPU multi-processor). In particular, the configuration can improve cache utilization. In addition, algorithms execute on a tile in complete isolation from other tiles which can be exploited to fill a GPU with many algorithms that when scheduled in isolation would not have enough exposed parallelism to run efficiently on a GPU. For example, in the case of NVIDIA GPUs, the partitions 936, 938, 940 may be aligned on SM boundaries so that all tiles in a partition share the same L1 cache of that SM. In this case, when one or a small set of codelets execute in a partition, the L1 cache maintains substantially the same information which improves overall performance. This configuration also may reduce contention relative to the task pool configuration in FIG. 8 since codelet requests are spread across multiple ingress rings 922, 924, 926. Herein, GPU tiles are anonymous only within a partition. A single egress ring 928 is shared across all partitions to accept codelet completion tokens. In some embodiments, more than one egress rings may be employed. In another embodiment for a dataflow application, one partition consisting of a single tile for a relatively small DSP computation may be reserved. Another partition of several tiles could host all forward and inverse FFT codelets since functions and data are shared (i.e., coefficient table, bit-reversal function) across those algorithms. A third partition may serve as a general-purpose task pool for any remaining codelets where locality is not beneficial.

Figure 10:
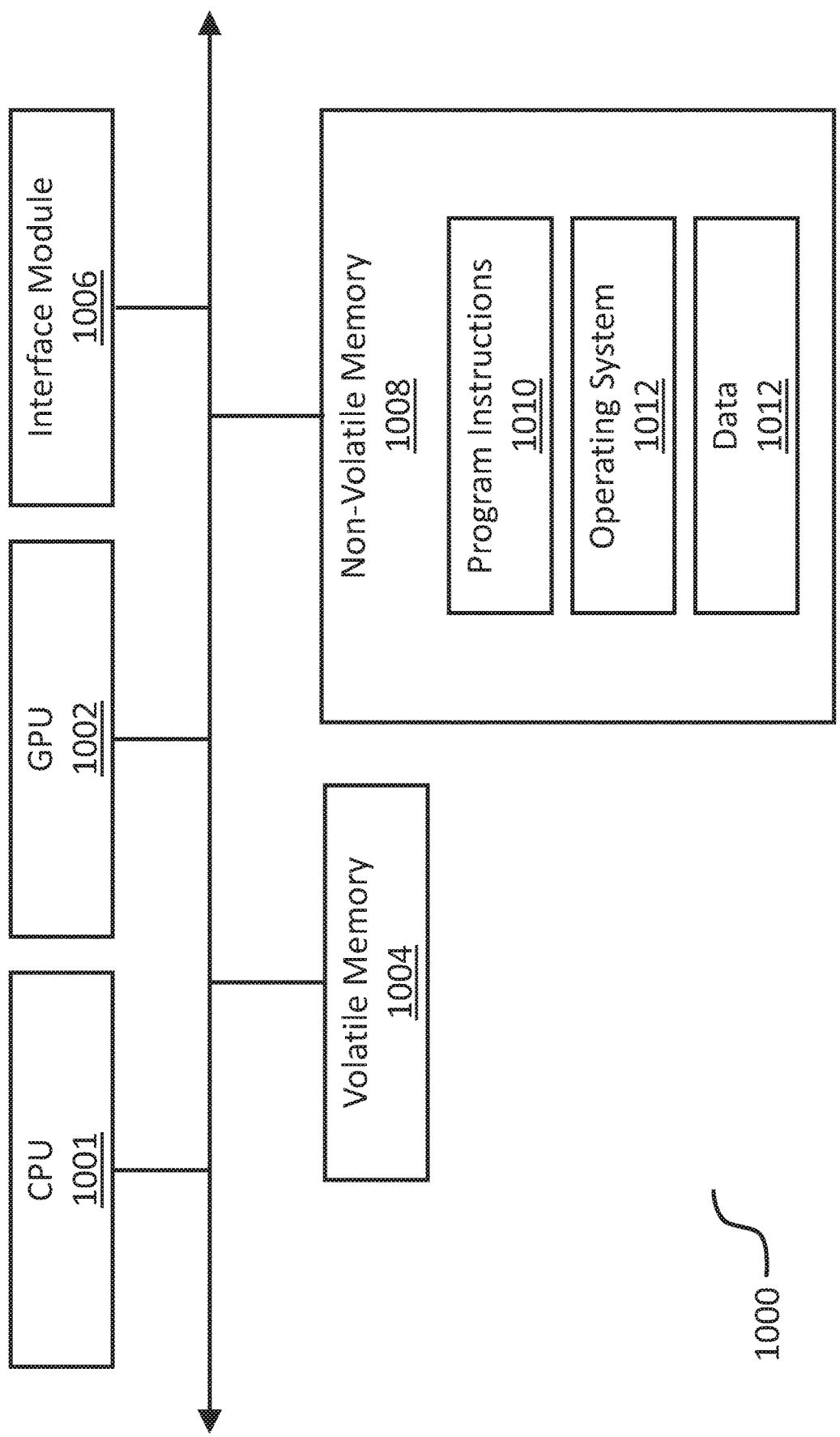
FIG. 10 is an illustrative implementation of a system described in FIG. 2 according to the concepts described herein.

Referring now to FIG. 10, an illustrative implementation of a processing device 1000 which may be suitable to implement the processing techniques described herein includes a CPU 1002, a GPU 1004, a volatile memory 1004, a non-volatile memory 1008 (e.g., hard disk) and the interface module 1008 (e.g., a user interface, USB interface and so forth). The non-volatile memory 1008 may store computer instructions 1010, an operating system 1012 and data 1014. In one example, the computer instructions 1010 are executed by the CPU 1002 out of volatile memory 1004 to perform all or part of the processes described herein (e.g., processes 500, 600).

The processes described herein (e.g., processes 500, 600) are not limited to use with hardware and software of FIG. 2 or 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The inventive concepts described herein provides a software middleware that presents a GPU device not as a wide but restrictive vector processor but as a flexible compute cluster or a manycore CPU. Accordingly, the "virtual" compute cluster or manycore CPU may be programmed using task-based or message-based programming models familiar to CPU programmers. The architecture described herein implements a scalable user space software runtime (including a GPU scheduler) and a lightweight application framework for constructing and accelerating dataflow graphs on both multicore CPU and GPU devices.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A method comprising:
forming a virtual tile cluster, wherein the virtual tile cluster comprises a plurality of tiles, wherein each of the tiles comprises a main processor and memory from a Central Processing Unit (CPU) device or a Graphics Processing Unit (GPU) device, and wherein a tile in the GPU device further comprises one or more subprocessors;
forming a virtual unified memory, wherein the virtual unified memory is accessible by the CPU device and GPU device and the virtual unified memory comprises one or more ingress rings and one or more egress rings;
generating a task;
assigning the task to at least one tile of the virtual tile cluster according to a pre-defined rule;
inserting the task into an ingress ring in the virtual unified memory;
in response to the task being assigned to the at least one tile in the GPU device:
broadcasting the task to the one or more subprocessors of the at least one tile using a GPU shuffle instruction; and
dividing data associated with the task and assigning each of divided data to each of the one or more subprocessors, wherein the each of the one or more subprocessors runs a codelet corresponding to the task using the each of divided data; and
executing the task by the at least one tile of the virtual tile cluster.

2. The method of claim 1, further comprising:
generating or assigning a thread corresponding to the task, wherein the thread is suspended when the task is assigned to the at least one tile;
inserting a completion token for the task into an egress ring in the virtual unified memory upon completion of execution of the task; and
in response to pulling the completion token from the egress ring, waking up the thread.

3. The method of claim 2, wherein the completion token comprises a reference to a barrier to the CPU device that is associated with the thread and the barrier is unblocked upon the pulling the completion token.

4. The method of claim 1, wherein the main processor of the at least one tile in the GPU device comprises a vector processor and the one or more subprocessors comprises one or more scalar processors.

5. The method of claim 1, wherein numbers of the one or more ingress ring and one or more egress ring are configurable.

6. The method of claim 1, wherein the task is dispatched based upon an opcode of the task.

7. The method of claim 1, wherein the task is broadcasted by a hardware instruction of the GPU device comprising the GPU shuffle instruction.

8. The method of claim 1, wherein the codelet corresponding to the task is selected from a codelets package.

9. The method of claim 1, wherein a lane of each of the tiles is delegated to interact with the ingress ring and the lane dispatches the task from the ingress ring.

10. The method of claim 1, wherein a subrange of the divided data assigned to a subprocessor is different from another subrange of the divided data assigned to another subprocessor.

11. The method of claim 1, wherein at least one ingress ring and at least one egress ring are dedicated to each tile of the virtual tile cluster.

12. The method of claim 1, wherein the pre-defined rule comprises mapping a tile of the virtual tile cluster to one or more codelets.

13. A system comprising:
a Central Processing Unit (CPU) runtime;
a Graphics Processing Unit (GPU) runtime;
a virtual tile cluster comprising a plurality of tiles, wherein each of the tiles comprises a main processor and memory from the CPU runtime and GPU runtime, and wherein a tile in the GPU runtime further comprises one or more subprocessors;
a virtual unified memory comprising one or more ingress rings and one or more egress rings, wherein the virtual unified memory is accessible by the CPU runtime and GPU runtime,
wherein the CPU runtime is configured to:
generate a task;
assign the task to at least one tile of the virtual tile cluster according to a pre-defined rule; and
execute the task by the at least one tile of the virtual tile cluster,
wherein the GPU runtime is configured to:
in response to the task being assigned to the at least one tile in the GPU runtime, insert the task into an ingress ring in virtual unified memory;
broadcast the task to the one or more subprocessors of the at east one the using a GPU shuffle instruction; and
divide data associated with the task and assigning each of divided data to each of the one or more subprocessors, wherein the each of the one or more subprocessors runs a codelet corresponding to the task using the each of divided data.

14. The system of claim 13, wherein the CPU runtime is further configured to:
generate or assign a thread corresponding to the task, wherein the thread is suspended when the task is assigned to the at least one tile; and
in response to pulling a completion token from an egress ring in the virtual unified memory, waking up the thread, wherein the GPU runtime inserts a completion token for the task into the egress ring in the virtual unified memory upon completion of execution of the task.

15. The system of claim 14, wherein the completion token comprises a reference to a barrier to the CPU runtime that is associated with the thread and the barrier is unblocked upon the pulling the completion token.

16. The system of claim 13, wherein the main processor of the at least one tile in the GPU runtime comprises a vector processor and the one or more subprocessors, wherein each subprocessor comprise a scalar processor.

17. The system of claim 13, wherein numbers of the one or more ingress rings and one or more egress rings are configurable.

18. The system of claim 13, wherein the task is broadcasted by a hardware instruction of the GPU runtime comprising the GPU shuffle instruction.

19. The system of claim 13, wherein the pre-defined rule comprises mapping a tile of the virtual tile cluster to a codelet.

* * * * *